US011451632B2

(12) United States Patent
Sukeerthi et al.

(10) Patent No.: US 11,451,632 B2
(45) Date of Patent: Sep. 20, 2022

(54) SYSTEM AND METHOD FOR SUPPORTING WIRED AND WIRELESS COMMUNICATIONS IN INDUSTRIAL SAFETY SYSTEMS

(71) Applicant: Honeywell International Inc., Morris Plains, NJ (US)

(72) Inventors: Chunchgatta Narendra Harsha Sukeerthi, Bangalore (IN); Amol Kinage, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 70 days.

(21) Appl. No.: 16/662,861

(22) Filed: Oct. 24, 2019

(65) Prior Publication Data

US 2020/0137167 A1    Apr. 30, 2020

Related U.S. Application Data

(60) Provisional application No. 62/751,816, filed on Oct. 29, 2018.

(51) Int. Cl.
| | |
|---|---|
| *H04L 69/18* | (2022.01) |
| *H04L 67/125* | (2022.01) |
| *G05B 19/042* | (2006.01) |
| *H04W 4/20* | (2018.01) |

(52) U.S. Cl.
CPC ........ *H04L 67/125* (2013.01); *G05B 19/0421* (2013.01); *G05B 19/0428* (2013.01); *H04L 69/18* (2013.01); *H04W 4/20* (2013.01); *G05B 2219/24024* (2013.01)

(58) Field of Classification Search
CPC ..... H04W 24/08; H04W 28/24; H04W 48/18; H04W 4/70; H04W 76/15; H04W 88/08
See application file for complete search history.

(56) References Cited

U.S. PATENT DOCUMENTS

| | | | | |
|---|---|---|---|---|
| 2013/0021167 | A1* | 1/2013 | Harper, Jr. ............... | G05B 9/02 340/870.01 |
| 2013/0094447 | A1* | 4/2013 | Gidlund .................. | H04L 69/22 370/328 |
| 2018/0107188 | A1* | 4/2018 | Nixon ................... | G05B 19/052 |
| 2018/0321662 | A1* | 11/2018 | Nixon ................... | G06F 13/364 |

* cited by examiner

*Primary Examiner* — Minh Trang T Nguyen
(74) *Attorney, Agent, or Firm* — Paschall & Associates, LLC; Mark Goldberg

(57) ABSTRACT

This disclosure provides an apparatus, system and method for supporting wired and wireless communications in industrial safety systems. The apparatus, system and method involve a safety management controller comprising one or more processors, one or more wired interfaces, and one or more wireless interfaces; wherein the safety management controller supports an application stack associated with an open industrial protocol that operates over multiple communication protocols, at least one of the communication protocols comprising a wired communication protocol, at least one other of the communication protocols comprising a wireless communication protocol.

14 Claims, 2 Drawing Sheets

SYSTEM AND METHOD FOR SUPPORTING WIRED AND WIRELESS COMMUNICATIONS IN INDUSTRIAL SAFETY SYSTEMS

This application claims priority from application 62/751,816, filed Oct. 29, 2018, which is incorporated herein in its entirety.

This disclosure generally relates to industrial safety systems. More specifically, this disclosure relates to a system and method for supporting wired and wireless communications in industrial safety systems.

BACKGROUND

Many industrial safety control systems originally supported only wired communications for safety device integration, often due to actual or perceived concerns over wireless communication reliability. However, the use of wireless safety devices is becoming more widespread as (i) more and more wireless devices enter the marketplace and (ii) more and more customers have come to accept the reliability of wireless technology. The use of wireless safety devices can provide clear advantages, such as reduced costs and easier installations and maintenance.

There is a growing demand for wireless field instrument usage in safety applications. For example, wireless gas detectors that satisfy safety integration level (SIL) 2 safety standards are entering the market. It may be needed or desired to integrate wireless safety field devices into a safety manager for a safety system (such as those available from Honeywell International Inc. or other SIL-certified integrated safety platforms or other safety platforms.

SUMMARY

This disclosure provides a system and method for supporting wired and wireless communications in industrial safety systems.

More particularly, the invention involves an apparatus comprising: a safety management controller comprising one or more processors, one or more wired interfaces, and one or more wireless interfaces; wherein the safety management controller supports an application stack associated with an open industrial protocol that operates over multiple communication protocols, at least one of the communication protocols comprising a wired communication protocol, and at least one other of the communication protocols comprising a wireless communication protocol. The apparatus may include an application profile associated with the open industrial protocol is common across all of the communication protocols. In the apparatus, the one or more wired interfaces au comprise an IEEE 802.3 transceiver; and the one or more wireless interfaces comprise an IEEE 802.15.4 wireless radio. In the apparatus the open industrial protocol may comprise a PROFIsafe or openSAFETY protocol; and the communication protocols may comprise ISA100, PROFINET, and SafeNet protocols. One of the interfaces of the safety management controller may be configured to communicate with at least one wireless device via a wireless gateway. In another embodiment, the invention is a system comprising one or more wired safety devices; one or more wireless safety devices; and a safety management controller comprising a safety management controller comprising one or more processors, one or more wired interfaces, and one or more wireless interfaces; wherein the safety management controller supports an application stack associated with an open industrial protocol that operates over multiple communication protocols, at least one of the communication protocols comprising a wired communication protocol, at least one other of the communication protocols comprising a wireless communication protocol and wherein an application profile associated with the open industrial protocol is common across all of the communication protocols. The system may include the one or more wired interfaces comprising an IEEE 802.3 transceiver; and the one or more wireless interfaces comprising an IEEE 802.15.4 wireless radio. The system may include the open industrial protocol that comprises a PROFIsafe or openSAFETY protocol; and the communication protocols that comprises ISA100, PROFINET, and SafeNet protocols. At least one of the interfaces of the safety management controller may be configured to communicate with at least one wireless device via a wireless gateway. In yet another embodiment, the disclosure is a method comprising operating a safety management controller in an industrial safety system, the safety management controller comprising one or more processors, one or more wired interfaces, and one or more wireless interfaces; executing, by the safety management controller, an application stack associated with an open industrial protocol that operates over multiple communication protocols, at least one of the communication protocols comprising a wired communication protocol, at least one other of the communication protocols comprising a wireless communication protocol. In some embodiments, the application profile associated with the open industrial protocol is common across all of the communication protocols. In the method, the one or more wired interfaces comprise an IEEE 802.3 transceiver; and the one or more wireless interfaces comprise an IEEE 802.15.4 wireless radio. In the method, the open industrial protocol comprises a PROFIsafe or openSAFETY protocol; and the communication protocols comprise ISA100, PROFINET, and SafeNet protocols. In the method, at least one of the interfaces of the safety management controller is configured to communicate with at least one wireless device via a wireless gateway.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
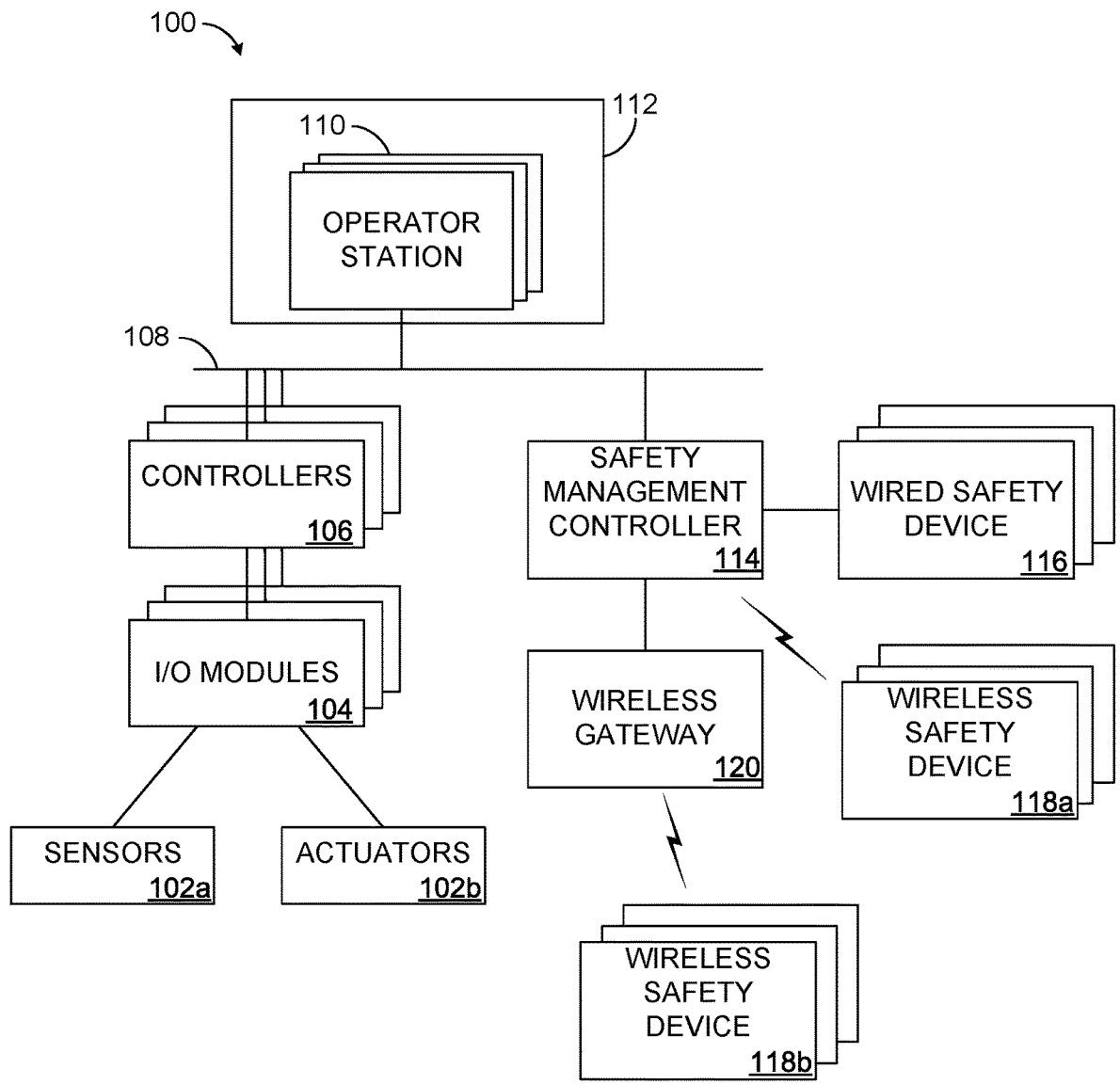
FIG. 1 illustrates an example industrial safety system according to this disclosure.
Figure 2:
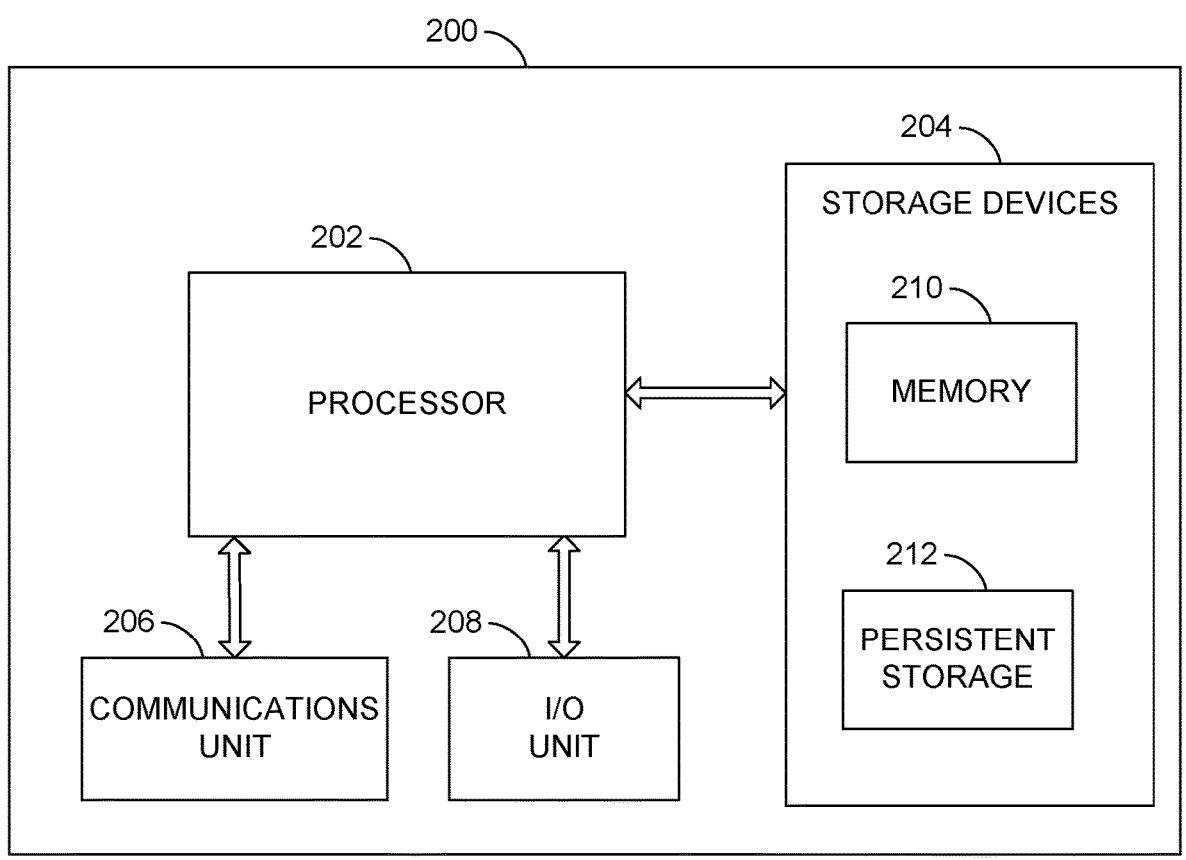
FIG. 2 illustrates an example device implementing a safety management controller for an industrial safety system according to this disclosure.

FIGS. 1 and 2, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, wireless safety devices are becoming more or more common in industrial safety control systems. However, to connect wireless safety devices to safety controllers in industrial safety systems, additional gateway devices and protocol converters are typically required. This increases the cost, complexity, and maintenance of the overall safety system.

This disclosure provides systems and methods for cost-effective integration that support direct wired and wireless connections of safety instruments to safety controllers. With open standards (such as SAFE protocols like PROFIsafe and openSAFETY) being increasingly used, it may be necessary or desirable for a safety controller to support one or more open protocols in a manner that is independent of the communication channels used (wired or wireless). The ability to support open protocols independent of the communication channels used can greatly increase the market for safety controllers, due among other things to the trend in moving towards open standards. Safety integrity levels (SIL) are defined as a relative level of risk-reduction provided by a safety function or to specify a target level of risk reduction. In simple terms, SIL is a measure of performance required for a safety instrumented function.

Current safety controllers operate using proprietary protocols that do not allow for easy integration with third-party safety devices supporting standard protocols. Supporting open standard protocols allows for seamless integration of safety controllers with third-party safety devices, which are already compliant with these open standards. The safety controllers described in this patent document provide for things such as peer-to-peer communications between safety controllers and safety devices using one or more open protocols, which can occur over any suitable wired or wireless connections. One specific example use of this technology would be for customers who use SIEMENS SIMATIC systems or devices and wish to integrate new HONEYWELL safety controllers into their systems. There is a need for effective communication between these different systems or devices.

FIG. 1 illustrates an example industrial safety system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one I/O module 104 is coupled to the sensors 102a and actuators 102b. The I/O modules 104 facilitate interactions with the sensors 102a, actuators 102b, or other field devices. For example, an I/O module 104 could be used to receive one or more analog inputs (AIs), digital inputs (DIs), digital input sequences of events (DISOEs), pulse accumulator inputs (PIs), or other inputs from one or more field devices. An I/O module 104 could also be used to provide one or more analog outputs (AOs), digital outputs (DOs), or other outputs to one or more field devices. Each I/O module 104 includes any suitable structure(s) for receiving one or more input signals from or providing one or more output signals to one or more field devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the I/O modules 104. A second set of controllers 106 could be used to optimize the control logic or other operations performed by the first set of controllers. A third set of controllers 106 could be used to perform additional functions. It is also possible that one set of controllers could be in a stand-by or load sharing mode to improve overall availability of the system.

Controllers 106 are often arranged hierarchically in a system. For example, different controllers 106 could be used to control individual actuators, collections of actuators forming machines, collections of machines forming units, collections of units forming plants, and collections of plants forming an enterprise. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a WINDOWS operating system, or other operating system.

The one or more networks 108 couple the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

Multiple operator stations 110 can be grouped together and used in one or more control rooms 112. Each control room 112 could include any number of operator stations 110 in any suitable arrangement. In some embodiments, multiple control rooms 112 can be used to control an industrial plant, such as when each control room 112 contains operator stations 110 used to manage a discrete part of the industrial plant.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In systems such as the system 100, safety is often of paramount concern. For example, when automating or controlling one or more industrial processes, it is typically necessary to operate equipment of the industrial processes within specified safety limits in order to protect nearby personnel from harm, to protect the nearby environment from damage, and to protect the equipment from damage. To support this, the system 100 includes at least one safety management controller 114. The safety management controller 114 can receive data associated with operation of components in the system 100, process the data to identify problems, and take corrective action to ensure safety when problems are identified. For example, the safety management controller 114 could obtain and process various types of data to identify dangerous or other problematic conditions. If a problematic condition is detected, the safety management controller 114 can initiate an emergency shutdown or other action.

In some embodiments, the safety management controller 114 can be used with one or more wired safety devices 116. The wired safety devices 116 typically represent detectors, sensors, or other devices that can generate measurements or other data used by the safety management controller 114. It should be noted, however, that the wired safety devices 116 could be omitted and the safety management controller 114 could receive the same or similar data from one or more wired sensors 102a. In other words, the wired sensors 102a could be used both for process control functions and safety functions.

As described in more detail below, the safety management controller 114 also supports interactions with one or more wireless safety devices 118a-118b. In this example, the safety management controller 114 can interact with one or more wireless safety devices 118a directly, and the safety management controller 114 can interact with one or more wireless safety devices 118b indirectly via at least one wireless gateway 120. Note, however, that both the wireless safety devices 118a and the wireless safety devices 118b/wireless gateways 120 need not be used in the same system.

The safety management controller 114 supports the use of one or more open protocols by incorporating at least one open protocol application stack over different communication protocols. For example, an open protocol application stack could support a PROFIsafe or openSAFETY protocol, and the open protocol application stack could be used over ISA100, PROFINET, and SafeNet communication protocols. If needed, all of the communication protocols can be used at the same time by the safety management controller 114. As a result, both wired and wireless communications can be supported by the safety management controller 114, enabling its use in a wide variety of applications. Redundant communication channels may or may not be used by the safety management controller 114, depending on the implementation.

Each safety management controller 114 represents any suitable structure configured to process data and perform safety-related functions in an industrial setting. In some embodiments, each safety management controller 114 can represent a SAFETY MANAGER SC safety system from HONEYWELL INTERNATIONAL INC., which can be modified to support various safety-related functions. Each wired safety device 116 represents any suitable device or system that performs one or more safety-related functions and communicates via at least one wired connection, such as wired detectors or wired safety systems. Each wireless safety device 118a-118b represents any suitable device or system that performs one or more safety-related functions and communicates via at least one wireless connection, such as wireless detectors or wireless safety systems. Each wireless gateway 120 represents any suitable device or system that enables wireless communications with wireless devices, such as a WIRELESS DEVICE MANAGER (WDM) from HONEYWELL INTERNATIONAL INC.

Although FIG. 1 illustrates one example of an industrial safety system 100, various changes may be made to FIG. 1. For example, the system 100 could include any number of sensors, actuators, I/O modules, controllers, operator stations, networks, safety management controllers, safety devices, wireless gateways, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control, process automation, or safety systems are highly configurable and can be configured in any suitable manner according to particular needs. In addition, FIG. 1 illustrates one example operational environment in which one or more safety management controllers can be used. This functionality can be used in any other suitable system.

FIG. 2 illustrates an example device 200 implementing a safety management controller for an industrial safety system according to this disclosure. For ease of explanation, the device 200 is described in the industrial safety system 100 of FIG. 1. The device 200 could, for example, represent at least part of a safety management controller 114 in FIG. 1. However, the device 200 could be used in any other suitable system, and the safety management controller 114 could be implemented in any other suitable manner.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry. The processor 202 could execute any suitable instructions, such as instructions implementing safety management functionality.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

Each communications unit 206 represents an interface supporting communications with other systems or devices. For example, at least one communications unit 206 could include one or more wireless radios for communicating with wireless devices, such as one or more wireless safety devices 118b. At least one communications unit 206 could also include one or more wired transceivers for communicating with wired devices, such as one or more wired safety devices 118a. Each communications unit 206 may support communications through any suitable physical or wireless communication link(s).

Each I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the use of the I/O unit 208 for local I/O may not be needed, such as when the device 200 is accessible locally or remotely over a network connection.

Although FIG. 2 illustrates one example of a device 200 implementing a safety management controller for an industrial safety system, various changes may be made to FIG. 2. For example, various components in FIG. 2 could be combined, further subdivided, or omitted and additional components could be added according to particular needs. Also, computing and communication devices can come in a wide variety of configurations, and FIG. 2 does not limit this disclosure to any particular configuration of computing or communication device.

Additional details regarding example implementations of the safety management controller 114 may be added to the systems that are built incorporating the disclosure as set forth herein. Note that these details relate to specific implementations of the safety management controller 114 and that other embodiments of the safety management controller 114 could also be used. For example, specific protocols, vendors/manufacturers, devices, and safety standards may be described below, although these are for illustration only and do not limit the scope of this disclosure to the specific protocols, vendors/manufacturers, devices, and safety standards described.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
  a safety management controller comprising one or more processors, one or more wired interfaces, and one or more wireless interfaces,
  wherein the safety management controller supports an application stack associated with an open industrial protocol that operates over multiple communication protocols, at least one of the communication protocols comprising a wired communication protocol, at least one other of the communication protocols comprising a wireless communication protocol, and
  wherein the wired communication protocol and the wireless communication protocol are used at the same time by the safety management controller.

2. The apparatus of claim 1, wherein an application profile associated with the open industrial protocol is common across all of the communication protocols.

3. The apparatus of claim 1, wherein:
  the one or more wired interfaces comprise an IEEE 802.3 transceiver; and the one or more wireless interfaces comprise an IEEE 802.15.4 wireless radio.

4. The apparatus of claim 1, wherein:
the open industrial protocol comprises a PROFIsafe or openSAFETY protocol; and
the communication protocols comprise ISA100, PROFINET, and SafeNet protocols.

5. The apparatus of claim 1, wherein at least one of the interfaces of the safety management controller is configured to communicate with at least one wireless device via a wireless gateway.

6. A system, comprising:
one or more wired safety devices;
one or more wireless safety devices; and
a safety management controller comprising one or more processors, one or more wired interfaces, and one or more wireless interfaces,
wherein the safety management controller supports an application stack associated with an open industrial protocol that operates over multiple communication protocols, at least one of the communication protocols comprising a wired communication protocol, at least one other of the communication protocols comprising a wireless communication protocol,
wherein an application profile associated with the open industrial protocol is common across all of the communication protocols, and
wherein the wired communication protocol and the wireless communication protocol are used at the same time by the safety management controller.

7. The system of claim 6, wherein:
the one or more wired interfaces comprise an IEEE 802.3 transceiver; and
the one or more wireless interfaces comprise an IEEE 802.15.4 wireless radio.

8. The system of claim 6, wherein:
the open industrial protocol comprises a PROFIsafe or openSAFETY protocol; and
the communication protocols comprise ISA100, PROFINET, and SafeNet protocols.

9. The system of claim 6, wherein at least one of the interfaces of the safety management controller is configured to communicate with at least one wireless device via a wireless gateway.

10. A method, comprising:
operating a safety management controller in an industrial safety system, the safety management controller comprising one or more processors, one or more wired interfaces, and one or more wireless interfaces; and
executing, by the safety management controller, an application stack associated with an open industrial protocol that operates over multiple communication protocols, at least one of the communication protocols comprising a wired communication protocol, at least one other of the communication protocols comprising a wireless communication protocol,
wherein the wired communication protocol and the wireless communication protocol are used at the same time by the safety management controller.

11. The method of claim 10, wherein an application profile associated with the open industrial protocol is common across all of the communication protocols.

12. The method of claim 10, wherein:
the one or more wired interfaces comprise an IEEE 802.3 transceiver; and
the one or more wireless interfaces comprise an IEEE 802.15.4 wireless radio.

13. The method of claim 10, wherein:
the open industrial protocol comprises a PROFIsafe or openSAFETY protocol; and
the communication protocols comprise ISA100, PROFINET, and SafeNet protocols.

14. The method of claim 10, wherein at least one of the interfaces of the safety management controller is configured to communicate with at least one wireless device via a wireless gateway.

* * * * *